(12) United States Patent
Radtke et al.

(10) Patent No.: US 10,396,639 B2
(45) Date of Patent: Aug. 27, 2019

(54) METHOD FOR PRODUCING A WINDING OF AN ELECTRIC MACHINE

(71) Applicant: CONTINENTAL AUTOMOTIVE GMBH, Hannover (DE)

(72) Inventors: Christoph Radtke, Berlin (DE); Mario Weseler, Niederorschel (DE); Tassilo Gellermann, Berlin (DE)

(73) Assignee: CPT Group GmbH, Hannover (DE)

( * ) Notice: Subject to any disclaimer, the term of this patent is extended or adjusted under 35 U.S.C. 154(b) by 120 days.

(21) Appl. No.: 15/306,009

(22) PCT Filed: Mar. 25, 2015

(86) PCT No.: PCT/EP2015/056378
§ 371 (c)(1),
(2) Date: Oct. 21, 2016

(87) PCT Pub. No.: WO2015/165654
PCT Pub. Date: Nov. 5, 2015

(65) Prior Publication Data
US 2017/0047826 A1    Feb. 16, 2017

(30) Foreign Application Priority Data

Apr. 29, 2014  (DE) .......................... 10 2014 208 082

(51) Int. Cl.
    *H02K 15/00*     (2006.01)
(52) U.S. Cl.
    CPC ................................ *H02K 15/0087* (2013.01)
(58) Field of Classification Search
    CPC .. H02K 1/16; H02K 3/04; H02K 2/28; H02K 3/34; H02K 15/095; H02K 15/10; H02K 15/0087
    See application file for complete search history.

(56) References Cited

U.S. PATENT DOCUMENTS

| 1,742,190 A | 1/1930 | Apple et al. |
| 2,400,902 A | 5/1946 | Allen et al. |

(Continued)

FOREIGN PATENT DOCUMENTS

| CN | 1768465 A | 5/2006 |
| CN | 101350547 A | 1/2009 |

(Continued)

OTHER PUBLICATIONS

International Search Report and Written Opinion dated Apr. 16, 2015 from corresponding International Patent Application No. PCT/EP2015/056378.

(Continued)

*Primary Examiner* — Carl J Arbes

(57) ABSTRACT

A method for manufacturing a coil of an electrical machine includes providing a laminated core having a first and a second slot, and inserting a first winding segment in the first slot to a first region having a first end portion and a second winding segment in the second slot to a second area having a second end portion. The method includes adhering the first end portion by inserting in a first recess a bending device and by positioning of a retaining element into a locking position in the first recess, and holding the second end portion by inserting in a second recess of the bender. The method includes bending the first and the second range in a bending direction to a first bending angle. The method also includes releasing the first end portion, and turning the second region in the bending direction to a second bending angle.

10 Claims, 10 Drawing Sheets

(56) References Cited

U.S. PATENT DOCUMENTS

| | | | |
|---|---|---|---|
| 4,437,230 A | 3/1984 | Greutmann | |
| 6,339,871 B1 | 1/2002 | Maesoba et al. | |
| 6,376,961 B2 * | 4/2002 | Murakami | H02K 3/14 |
| | | | 310/179 |
| 6,388,358 B1 * | 5/2002 | Umeda | H02K 3/12 |
| | | | 310/179 |
| 6,462,453 B1 | 10/2002 | Asao et al. | |
| 6,903,479 B2 * | 6/2005 | Kato | H02K 15/0037 |
| | | | 310/201 |
| 7,091,644 B2 * | 8/2006 | Fukushima | H02K 3/28 |
| | | | 310/179 |
| 2013/0276295 A1 | 10/2013 | Guercioni | |

FOREIGN PATENT DOCUMENTS

| | | | |
|---|---|---|---|
| DE | 4301234 A1 | | 8/1993 |
| DE | 10016151 A1 | | 10/2000 |
| DE | 60102398 T2 | | 2/2005 |
| DE | 60210572 T2 | | 3/2007 |
| DE | 102012219668 A1 | | 11/2013 |
| JP | 1017342 B | * | 3/1989 |
| JP | 2002335657 A | | 11/2002 |
| JP | 2006033964 A | * | 2/2006 |
| JP | 4006637 B2 | * | 11/2007 |
| KR | 20130130519 A | | 12/2013 |
| WO | 2004088824 A1 | | 10/2004 |
| WO | 2013127541 A2 | | 9/2013 |

OTHER PUBLICATIONS

German Office Action dated Dec. 12, 2014 for corresponding German Patent Application No. 10 2014 208 082.7.

* cited by examiner

METHOD FOR PRODUCING A WINDING OF AN ELECTRIC MACHINE

TECHNICAL FIELD

The disclosure relates to a method and to a device for producing a winding of a winding carrier, which is of a stator or a rotor, of an electric machine.

BACKGROUND

Electric machines include winding carriers that include a laminated core together with windings that are inserted into the laminated core and are realized as stators or rotors of the electric machines. In this case, the windings are realized from a number of winding pins (also referred to as winding rods) which are realized in a hairpin-shaped or a U-shaped manner and include in each case two legs as winding segments.

To form windings, the two legs of the respective winding pins are interlocked and cranked by way of an expanding step via a winding pitch of the winding carrier such that the two legs, which are cranked with respect to one another, of each individual winding pin are able to be inserted into corresponding slots of the laminated core, which are provided for that purpose, corresponding to the winding pitch of the winding carrier.

Exposed regions, which protrude from the laminated core, of the two legs of the respective winding pins are then, also corresponding to the winding pitch of the winding carrier, interlocked at in each case a predefined bending angle and are connected electrically to exposed regions, which are also interlocked at a predetermined bending angle, of the legs of the respective winding pins which are arranged spaced apart corresponding to the winding pitch.

To produce electrical connections between the windings and an external power source or control device, exposed regions of legs of a few selected winding pins are interlocked at a bending angle that deviates from the previously named bending angle compared to the legs of the remaining winding pins.

As is usual in the case of technical components, there is a general requirement in the case of electric machines to produce them, where possible, cost-efficiently in a simple production process. The requirement is very important in the automotive sector in particular.

SUMMARY

Therefore, it is desirable to have a method and device configured to provide a simple and cost-efficient option for producing a winding carrier of an electric machine and consequently an electric machine.

One aspect of the disclosure provides a method for producing a winding of a winding carrier, which is of a stator or a rotor, of an electric machine.

The method includes providing a laminated core that includes at least one first slot for receiving at least one first winding segment of the winding and at least one second slot for receiving at least one second winding segment of the winding. The method also includes: inserting the at least one first winding segment into the at least one first slot up to at least one first region which includes a first exposed end portion; and inserting the at least one second winding segment into the at least one second slot up to at least one second region which includes a second exposed end portion.

In addition, the method may also include retaining the first end portion as a result of inserting the first end portion into a first recess of a first bending device and as a result of positioning a first retaining element into a locking position in the first recess, and retaining the second end portion as a result of inserting the second end portion in a second recess of the first bending device. The method also includes bending the first and the second region in a first bending direction about a first bending angle as a result of rotating the first bending device about a rotational axis concentrically with respect to the laminated core, whilst the first and the second end portions are retained. Additionally, the method includes releasing the first end portion as a result of moving the first retaining element from the locking position into an unlocking position, and moving the second region further in the first bending direction about a second bending angle once the first end portion has been released.

Implementations of the disclosure may include one or more of the following optional features. In some implementations, a known type of laminate core is provided accordingly for producing a winding carrier. The laminated core includes at least one first slot for receiving at least one first winding segment of the winding and at least one second slot for receiving at least one second winding segment of the winding. In this case, the at least one first and the at least one second slots are arranged along a first "virtual" circle or another closed line that is concentric with respect to the laminated core or is aligned centrally with respect to the laminated core.

The winding segments are, for example, the legs of the afore-named hairpin-shaped winding pins or straight wires formed in a rod-shaped manner produced from metal or metal alloy, such as, but not limited to, copper or copper alloy, which are inserted into the named slots for forming windings.

In some implementations, the at least one first winding segment is inserted into the at least one first slot for forming the winding with the exception of a first region. The first region projects out of the laminated core and includes a first exposed end portion. In an analogous manner, the at least one second winding segment is inserted into the at least one second slot for forming the winding with the exception of a second region. The second region projects out of the laminated core and includes a second exposed end portion.

In some examples, if the winding segments are realized as legs of hairpin-shaped winding pins, they are thus inserted, having been interlocked and cranked beforehand in the manner described at the beginning of the description, into the corresponding slots up to in each case an exposed region.

In some examples, if the winding segments are realized, in contrast, as rod-shaped straight wires, they are thus initially inserted into the corresponding slots up to in each case two exposed regions and are then interlocked at the respective two end regions.

In some implementations, the first end portion of the first region is inserted in a first recess of a first bending device and is retained in the first recess as a result of positioning a first retaining element in a locking position. A second exposed end portion of the second region may also be inserted in a second recess of the first bending device and may be retained by the second recess.

Whilst the first and the second end portions are retained, the first bending device is rotated concentrically with respect to the laminated core about a rotational axis.

As a result, the first and the second regions are bent about a first bending angle in a first bending direction. Generally speaking, the bending device and the laminated core are rotated toward one another. Consequently, the laminated core may also be rotated in relation to the bending device.

The first end portion may then be released as a result of moving or sliding or rotating (pivoting) the first retaining element from the locking position into an unlocking position. The second end portion, in contrast, may continue to be retained (i.e. is not released with the first retaining element).

In some examples, once the first end portion has been released, the second region is bent further about a second bending angle in the first bending direction.

The retaining elements may serve for the purpose of bending at least one selected end portion of all the end portions less strongly than the others. The selected end portions are released after a first bending step, whilst the others are bent further.

Using the named method, a winding carrier with winding segments is consequently produced where the winding segments may be interlocked at various bending angles in a simple and cost-efficient manner. The first winding segments, which are each bent at the first smaller bending angle, consequently include end portions that protrude in the axial direction of the laminated core beyond the end portions of the second winding segments. Consequently, the end portions of the first winding segments, which are provided for forming the electric connection to external components such as, for example, the power source or the control device, are able to be connected electrically to the external components in a simple manner.

As a result of realizing the method in simple method steps such as, for example, retaining, bending, releasing and bending further, a simple method is provided which may be realized without expensive tools or machines.

A method, by way of which a winding of a winding carrier and consequently also an electric machine are producible in a cost-efficient and simple manner, is consequently created.

According to a preferred development of the previously named method, a laminated core is provided which, along with the at least one first slot and the at least one second slot, also includes at least one third slot for receiving at least one third winding segment of the winding and at least one fourth slot for receiving at least one fourth winding segment of the winding. In this case, the at least one third slot and the at least one fourth slot are arranged along a second circle which is concentric with respect to the laminated core.

In some examples, the at least one third winding segment is inserted into the at least one third slot for forming the winding with the exception of a third region, the third region projecting out of the laminated core by way of a third exposed end portion. In an analogous manner, the at least one fourth winding segment may be inserted into the at least one fourth slot for forming the winding with the exception of a fourth region, the fourth region may also project out of the laminated core by way of a fourth exposed end portion.

The third exposed end portion of the third region may be retained as a result of introduction into a third slot of a second bending device and as a result of positioning a second retaining element in a locking position in the third recess. In an analogous manner, the fourth exposed end portion of the fourth region may be retained as a result of introduction into a fourth recess of the second bending device.

Whereas the third and the fourth end portions are retained, the third and the fourth regions are bent about a third bending angle as a result of rotating the second bending device about the rotational axis concentrically with respect to the laminated core in a second bending direction, which is opposite to the first bending direction.

The third end portion of the third region is then released as a result of moving or sliding the second retaining element from the locking position into an unlocking position and consequently no longer continues to be retained. The fourth end portion of the fourth region, in contrast, continues to be retained in or by the fourth recess. Once the third end portion has been released, the fourth region is bent further in the second bending direction about a fourth bending angle.

According to a further preferred development of the afore-described method, the first, the second, the third and the fourth regions are bent substantially at the same time about the first or the third bending angles during the first bending operation. The second and the fourth regions are preferably also bent at substantially the same time about the second or the fourth bending angles during the further bending operation.

As a result of carrying out the above-named bending operations at the same time, the forces, which act on the first, second, third and fourth regions during the bending operations, act on the laminated core in mutually opposite directions and are mutually compensated at the laminated core such that, in a comparative manner, a comparatively smaller additional force is necessary to retain the laminated core in a non-rotatable manner during the named bending operations.

Another aspect of the disclosure provides a device for producing a winding of a winding carrier of an electric machine. The device includes a retaining device that is set up for retaining a laminated core together with at least one first and at least one second winding segment concentrically with respect to a rotational axis. In addition, the device includes a bending device which includes at least one first recess for receiving and for retaining a first exposed end portion of the at least one first winding segment and at least one second recess for receiving and for retaining a second exposed end portion of the at least one second winding segment. The first and the second recesses may be arranged open toward the retaining device and concentrically with respect to the rotational axis on a "virtual" circle. The bending device, in this case, is mounted so as to be rotatable about the rotational axis in relation to the retaining unit.

In addition, the device includes at least one retaining element for retaining the first end portion. The retaining element may be arranged in the at least one first recess so as to be slidable or rotatable or both slidable and rotatable in relation to the at least one first recess between a locking position, in which the at least one retaining element retains the first end portion, and an unlocking position, in which the at least one retaining element releases the first end portion.

Accordingly, a device is created which includes components, such as, for example, a retaining device with recesses or a retaining element, which may be produced in a simple and cost-efficient manner. Using the components, the device is able to produce winding carriers in the simple afore-described method steps with variously bent winding segments in a cost-efficient manner.

In some implementations, the at least one first recess includes a side wall which is set up for retaining, with the at least one retaining element which is situated in the locking position, the first end portion of the first winding pin.

All or groups of retaining elements are preferably actuated jointly by means of a mechanical and/or electric connection. An actuator that moves the retaining elements individually or jointly is provided.

In some implementations, the device additionally includes an actuator device which is set up for moving, for example sliding or rotating or both sliding and rotating, the at least one retaining element between the locking and the unlocking positions.

The actuator device includes the afore-named actuator that, generally speaking, is able to generate a movement that is transmitted to the retaining elements. The actuator may also generate a movement by way of which the retaining elements are rotated.

Another aspect of the disclosure provides the device that includes a rotating and sliding device which is set up for rotating the bending device about the rotational axis and in relation to the retaining device and/or for sliding it in the direction of the rotational axis in relation to the retaining device.

Advantageous developments of the above-shown method, insofar as otherwise transferrable to the above-mentioned device, are also to be seen as advantageous developments of the device. In an analogous manner, advantageous developments of the above-described device, insofar as otherwise transferrable to the above-described method, are also to be seen as advantageous developments of the method.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
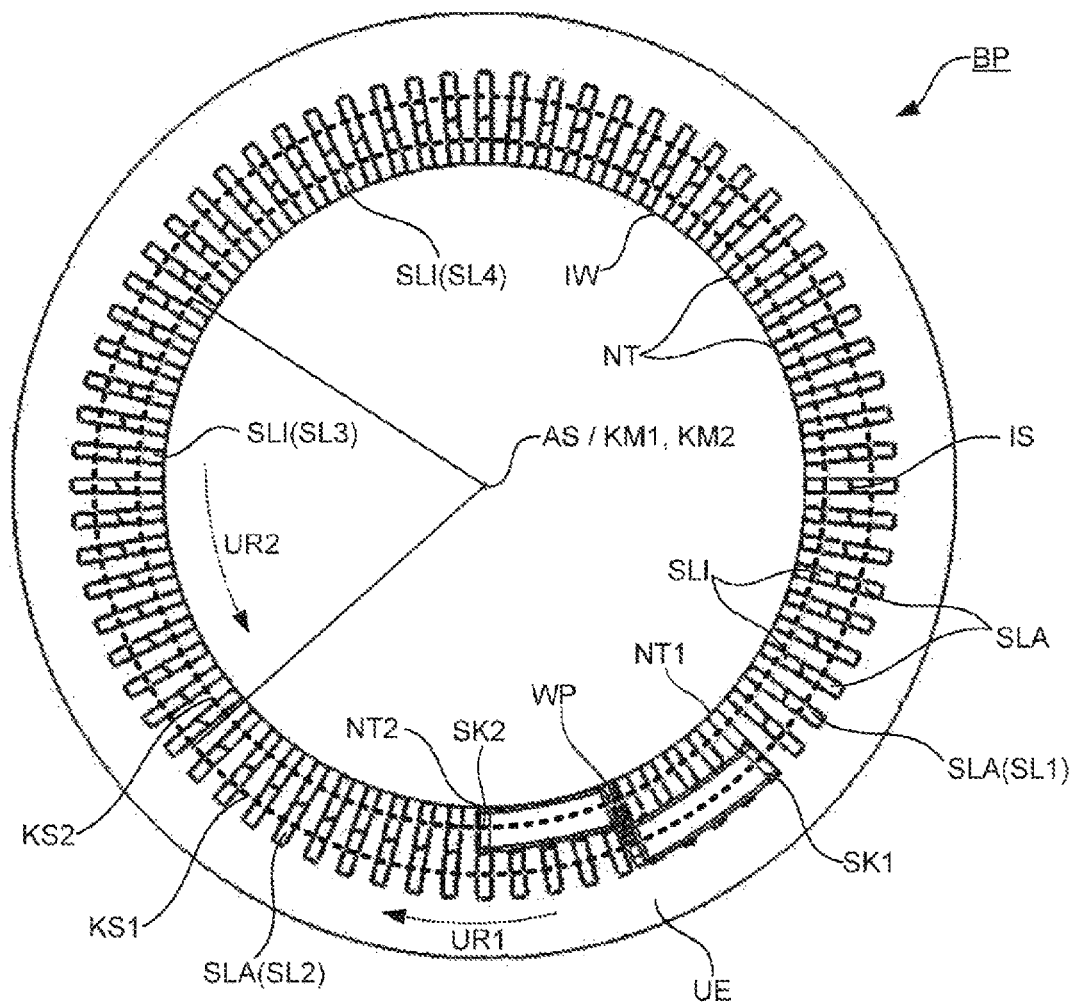
FIG. 1 shows a schematic representation of a view from below of an exemplary laminated core.

FIG. 1 shows a view from below of a laminated core BP for forming a stator ST of an electric machine. The laminated core BP is realized in a hollow-cylindrical form running around an axis AS. On an inside wall IW facing the axis AS, the laminated core BP includes a group of grooves NT (including NT1, NT2) which. When the group of grooves NT viewed from the axis AS, the group of grooves NT are arranged as radial indentations which are distributed uniformly along the inside wall IW of the laminated core BP and extend in the direction of the axis AS from a bottom end UE of the laminated core BP, which is located facing the observer of the Figure, to a top end OE of the laminated core BP which is oppositely situated to the bottom end UE (compare with FIG. 2).

In some implementations, a layer of insulation paper IS, which serves for the electric insulation between the laminated core BP and windings pins WP which are to be described below, is arranged in each case on the inside walls of the respective grooves NT. When viewed in the direction of the axis AS, the insulating paper layer IS may be in the form of an S or an 8. The insulating paper layer IS may consequently divides each of the grooves NT into two areas that extend in parallel from the bottom end UE to the top end OE of the laminated core BP. Proceeding from the axis AS when viewed radially, the two areas of the respective grooves NT are located one behind the other. On account of the narrow, elongated form, the two areas are referred to below as slots, in each case the area of the respective grooves NT facing the axis AS being referred to as the inside slot SLI and the area of the respective grooves NT remote from the axis AS being referred to as the outer slot SLA.

When viewed in the direction of the axis AS, the outer slots SLA or the centers of gravity or area center points thereof are situated along a first "virtual" circle KS1 having a first circle center point KM1. In an analogous manner, the inner slots SLI or the centers of gravity or area center points thereof, when viewed in the direction of the axis AS, are situated along a second "virtual" circle KS2 having a second circle center point KM2. The first and the second circle KS1 and KS2, in this case, form two circles that are concentric with respect to one another and with respect to the axis AS. Consequently, the circle center points KM1, KM2 overlap one another and the axis AS when viewed in the direction of the axis AS.

In some examples, to form windings, winding pins WP—also referred to as winding rods—produced from copper alloy are inserted into the grooves NT. In this case, the winding pins WP may be pre-bent in a hairpin-shaped or U-shaped manner and include one first leg SK1 and one second leg SK2 each. Prior to insertion into the grooves NT, the winding pins WP are interlocked and cranked in a manner known to the expert by way of an expanding step via a winding pitch of a stator ST, which is to be described below, such that the two legs SK1, SK2, which are cranked in relation to one another, of every individual winding pin WP are inserted, corresponding to the winding pitch of the laminated core BP, in each case into an outer slot SLA of a first groove NT1 and into an inner slot SLI of a second groove NT2 which is located at a spacing from the first groove NT1 corresponding to the winding pitch of the stator ST, as is illustrated as an example in FIG. 1 with a winding pin WP. In this case, the two legs of each individual winding pin WP realize one winding segment each of the windings WL.

Figure 2:
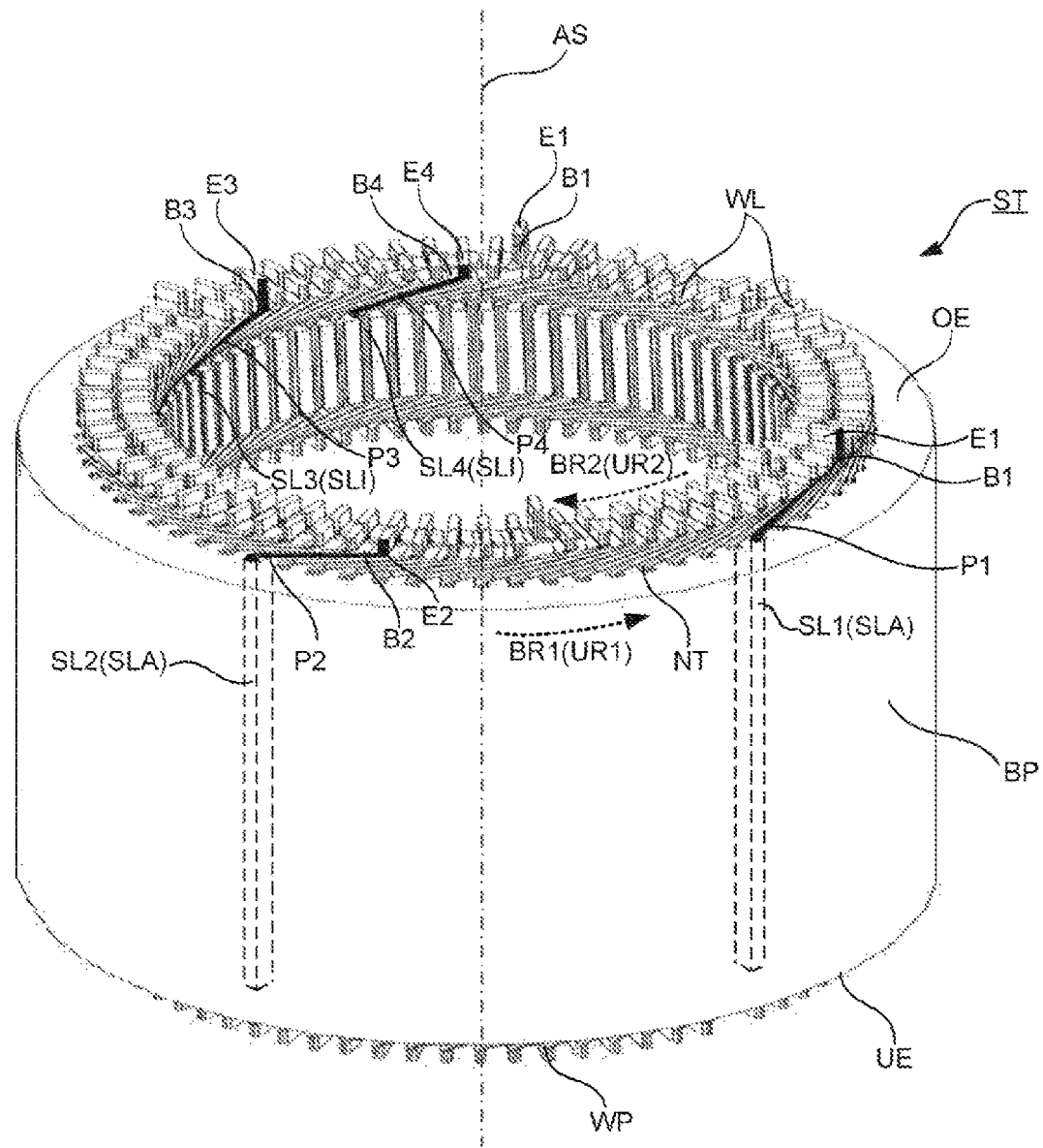
FIG. 2 shows a schematic representation of an exemplary oblique top view of a stator together with the laminated core shown in FIG. 1.

Reference is now made to FIG. 2 that shows a schematic representation of an oblique top view of a stator ST or a laminated core BP of a stator ST with installed windings WL. In some implementations, the stator ST includes a laminated core BP shown in FIG. 1 and a number of winding pins WP that are inserted into the respective grooves NT in the afore-described manner. In this case, the winding segments P1, P2, P3, and P4 of the winding pins WP are inserted into the respective grooves NT in such a manner that they each include a region B1, B2, B3 and B4 which projects out of the top end OE of the laminated core BP. To form windings WL, the regions B1, B2, B3, and B4 of the respective winding segments P1, P2, P3, and P4 are interlocked with one another in a manner to be described below corresponding to the winding pitch of the stator ST and are connected together electrically.

In some examples, to form windings WL, the winding segments P1, P2 inserted into the outer slots SLA or the regions B1, B2 thereof projecting out of the laminated core BP are bent in a first bending direction BR1, which corresponds to a first circumferential direction UR1 of the first circle KS1. The parts may be bent about an identical bending angle BW1+BW2 with the exception of a few selected winding segments P1.

Figure 5A:
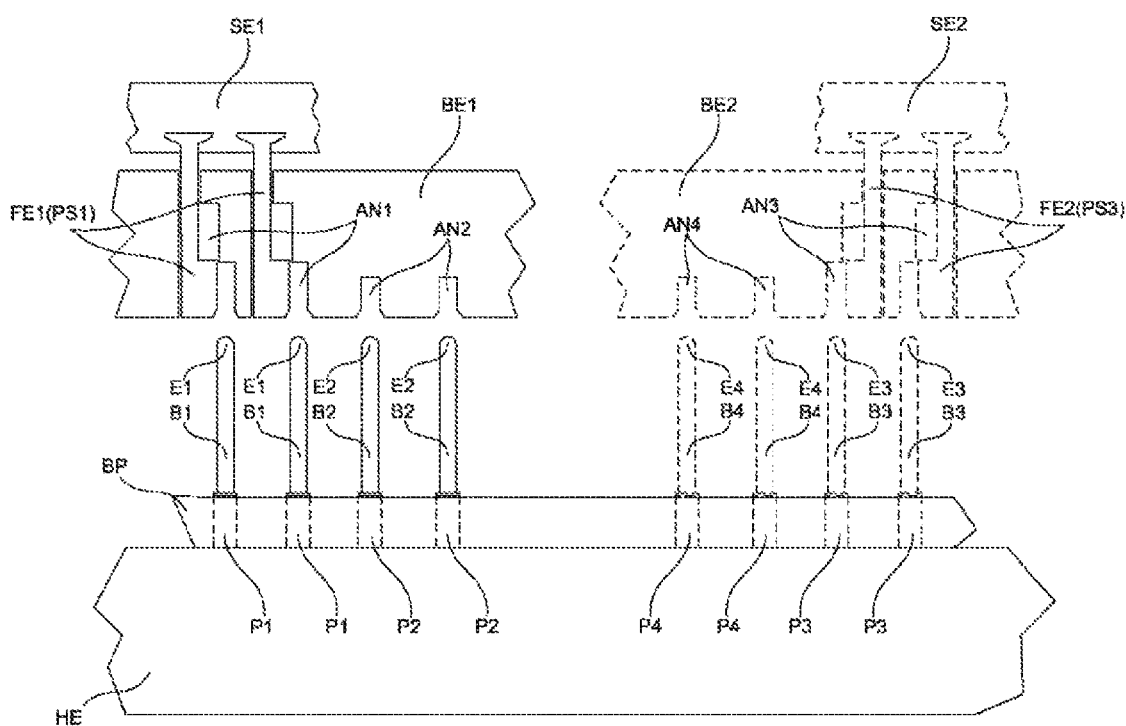
FIGS. 5A-5F show respective schematic representations of respective side views of the exemplary device shown in FIG. 3 and of intermediate products of the stator shown in FIG. 2 when it is being produced after each method step according to the method shown in FIG. 4.
Figure 5B:
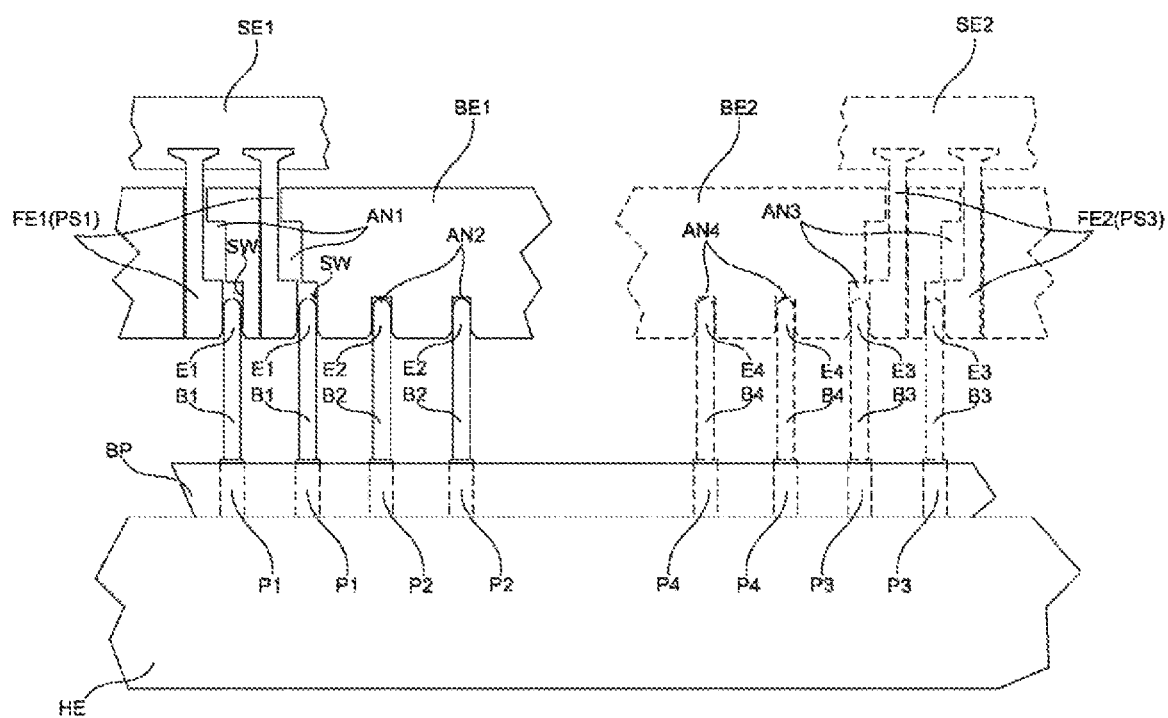
Figure 5C:
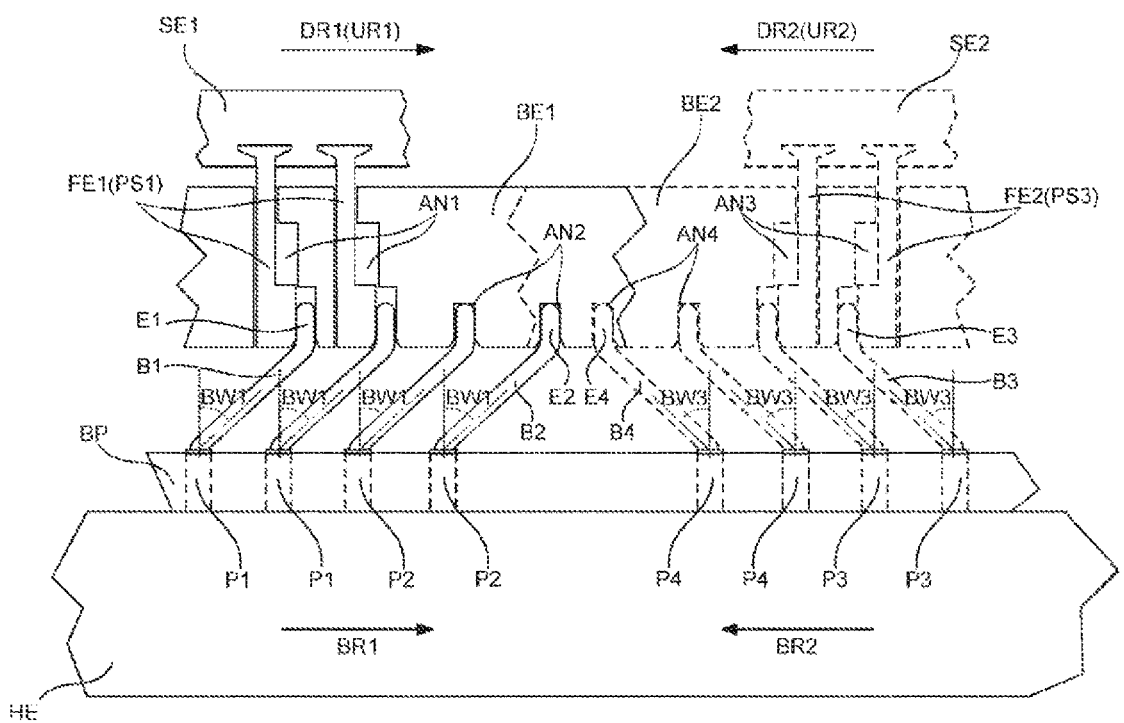
Figure 5D:
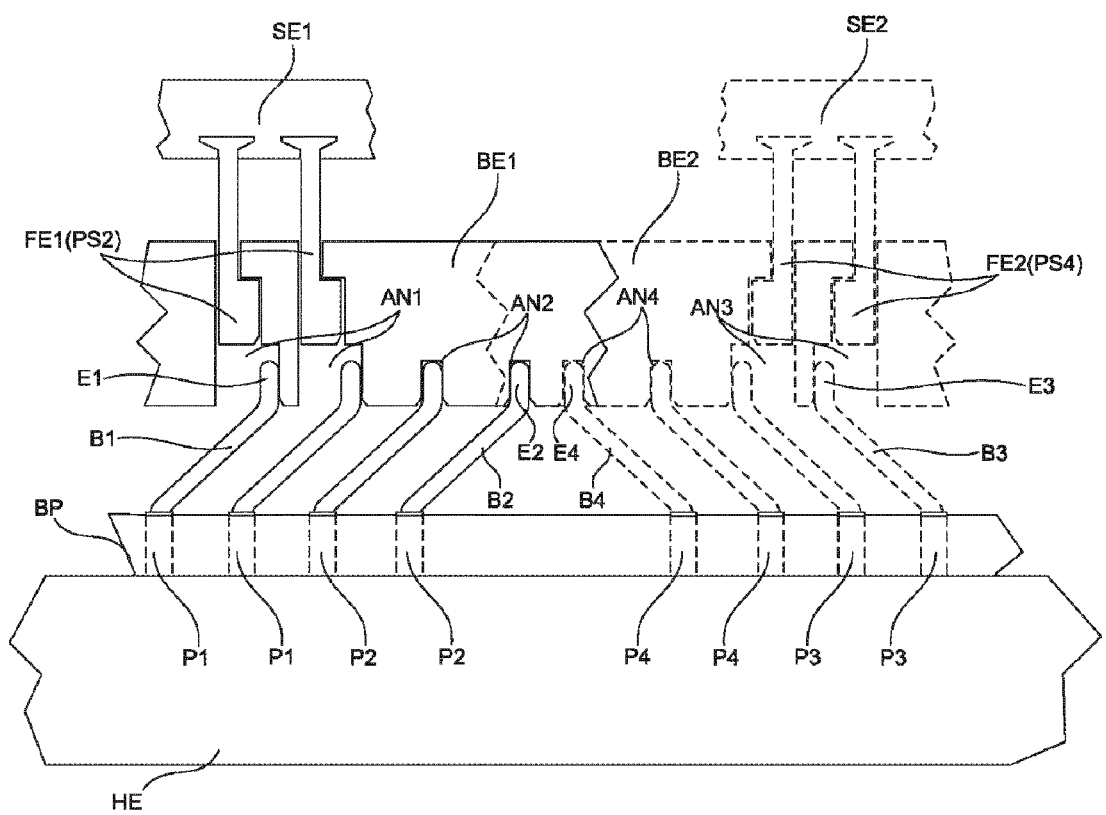
Figure 5E:
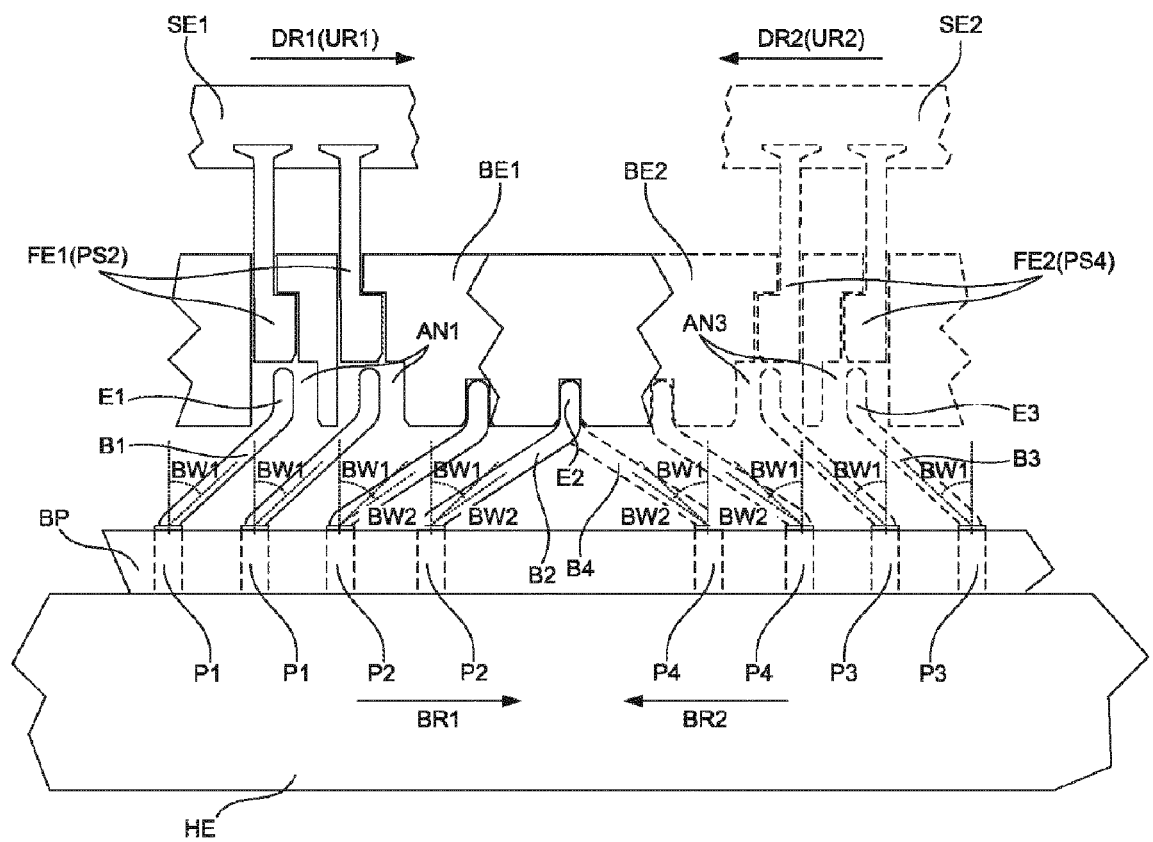
Figure 5F:
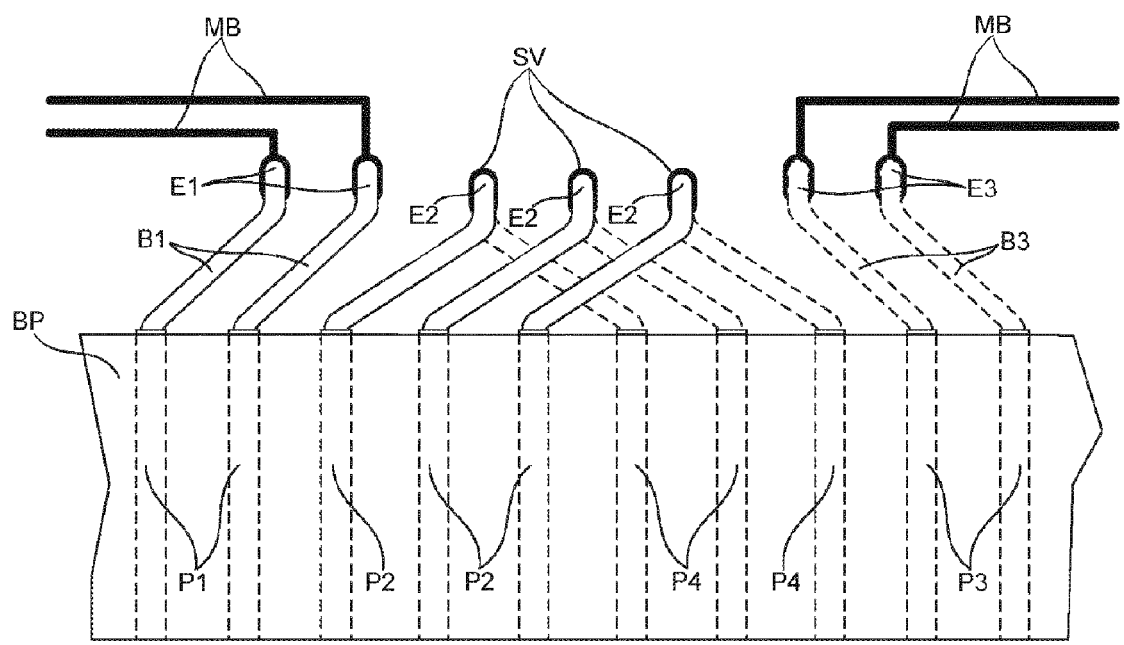

The selected winding segments P1 may be bent about a bending angle BW1 that deviates from the previously named bending angle BW1+BW2 (compare with FIG. 5E). The selected winding segments P1, which are referred to as first winding segments below, serve for forming an electric connection between the windings WL and an external power source or control device not shown in the Figure. The outer slots SLA, in which the first winding segments P1 are inserted, are referred to below as first slots SL1. The regions B1 of the first winding segments P1 projecting out of the laminated core BP are correspondingly referred to as first regions. The first regions B1 include in each case a first exposed end portion E1 that is realized protruding in the direction of the axis AS.

The remaining winding segments P2, which are bent about the identical bending angle BW1+BW2, are referred to below as second winding segments. The outer slots SLA in which the second winding segments P2 are inserted are referred to below as second slots SL2. The regions B2 of the second winding segments P2 protruding out of the laminated core BP are referred to below analogously as second regions. The second regions B2 include in each case a second exposed end portion E2 that is also realized protruding in the direction of the axis AS.

In an analogous manner, the winding segments P3, P4 inserted into the inner slots SLI or the regions B3, B4 thereof projecting out of the laminated core BP are bent in a second bending direction BR2, which is opposite to the first bending direction BR1 and corresponds to a second circumferential direction UR2 of the second circle KS2. In this case, winding segments P4 are also bent about an identical bending angle BW3+BW4 with the exception of a few selected winding segments P3.

The selected winding segments P3, analogously to the previously named first winding segments P1, are bent about a bending angle BW3 which deviates from the last named bending angle BW3+BW4 (compare with FIG. 5E). The selected winding segments P3 also serve for forming the electric connection between the windings WL and the external power source or control device and are referred to below as third winding segments. The inner slots SLI, in which the third winding segments P3 are situated, are referred to below as third slots SL3. The regions B3 of the third winding segments P3 projecting out of the laminated core BP are correspondingly referred to as third regions. The third regions B3 include in each case a third exposed end portion E3 that is realized protruding in the direction of the axis AS.

The remaining winding segments P4 that are bent about the identical bending angle BW3+BW4 are referred to below as fourth winding segments. The inner slots SLI in which the fourth winding segments P4 are inserted are referred to below as fourth slots SL4. The regions B4 of the fourth winding segments P4 protruding out of the laminated core BP are referred to below analogously as fourth regions. The fourth regions B4 include in each case a fourth exposed end portion E4 that is realized protruding in the direction of the axis AS.

In some implementations, for forming windings WL, the second end portion E2 of each individual second winding segment P2 is connected electrically in a manner to be described below to a fourth end portion E4 of each fourth winding segment P4, which is arranged at a spacing from the second winding segment P2 corresponding to the winding pitch of the stator BP.

The first and the third end portions E1, E3 are connected electrically to the external power source or control device by means of the electric connection not shown in the Figure. In this case, the first and the third end portions E1, E3 project beyond the plane of the second and fourth end portions E2 and E4 in the axial direction.

The manner in which the regions B1, B2, B3, and B4 of the winding segments P1, P2, P3, and P4 are bent at various bending angles B1, BW1+BW2, B3, or BW3+BW4 is described below as an example.

Figure 3:
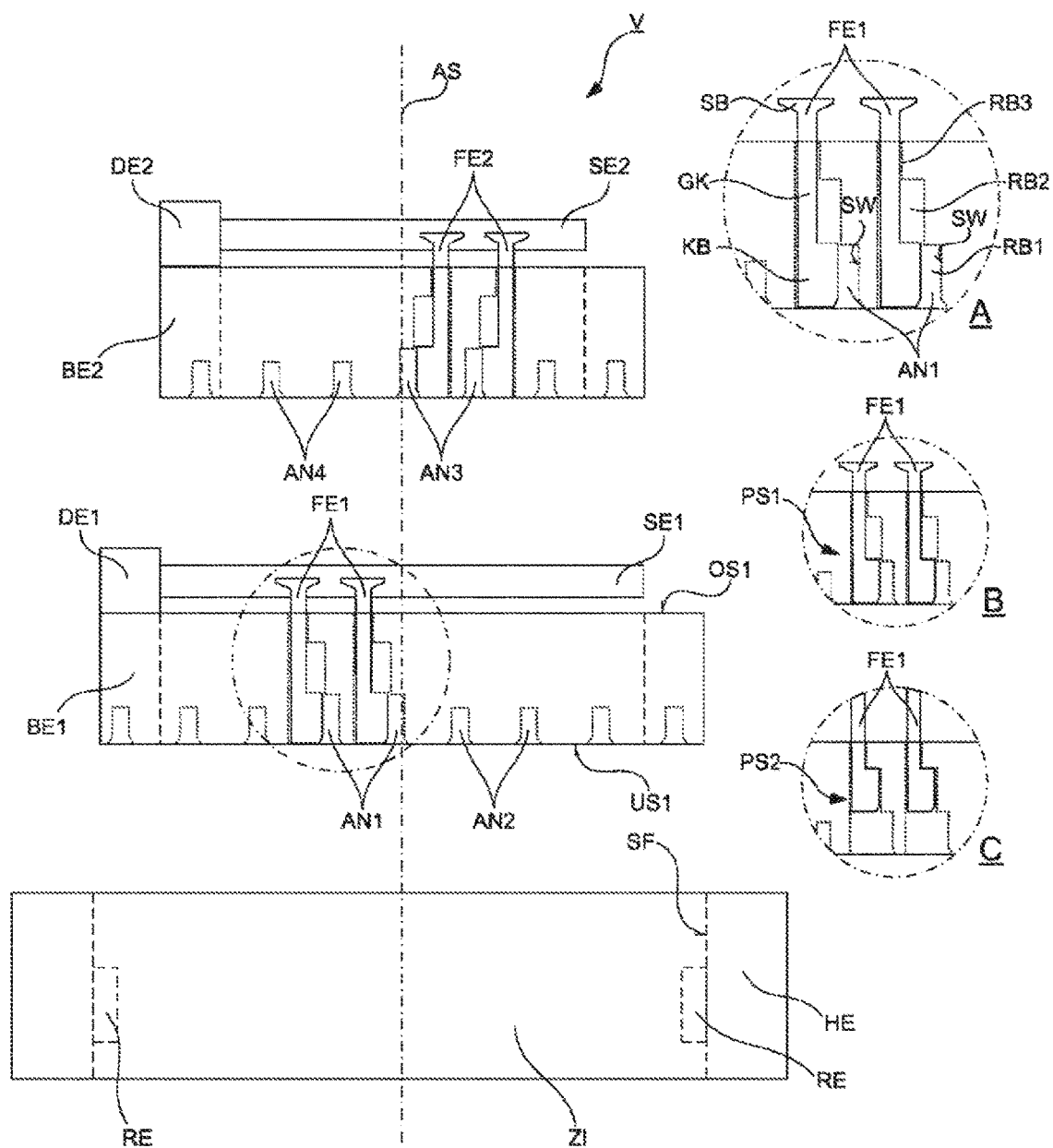
FIG. 3 shows a schematic representation of a side view of an exemplary device for producing the stator shown in FIG. 2.

Reference is now made to FIG. 3, which shows a schematic representation of a side view of a device V for producing the stator ST shown in FIG. 2 or for bending the regions B1, B2, B3 and B4 of the winding segments P1, P2, P3 and P4. In this case, the components of the device are shown axially offset from one another in a similar manner to an exploded drawing.

In some examples, the device V includes a retaining device HE for retaining the previously described laminated core BP together with the winding pins WP that are inserted into the grooves NT. The retaining device HE is realized in the form of a hollow cylinder that runs around an axis AS1 and consequently borders a cylinder-shaped interior ZI that is realized concentrically with respect to the retaining device HE. On the side face SF, which is shaped as a cylinder lateral surface and faces the interior ZI, the retaining device HE includes a number of latching elements RE which, when the laminated core BP is arranged in the interior ZI, latch into corresponding indentations (not shown in the Figure) on the outside wall of the laminated core BP in a manner known to the expert and consequently fix the laminated core BP in a non-movable, in particular non-rotatable manner, concentrically with respect to the axis AS1. If the laminated core BP is fixedly fixed in the interior ZI of the retaining device HE, the axis AS1 of the retaining device HE and the axis AS of the laminated core BP overlap.

The device V may additionally include a first bending device BE1 which is realized in the shape of a hollow cylinder and concentrically with respect to the retaining device HE and consequently to the axis AS1 of the retaining device HE. When viewed in the direction of the axis AS1, the first bending device BE1 is arranged offset from the retaining unit HE and is realized so as to be rotatable about the axis AS1 and in relation to the retaining device HE.

On a bottom surface US1 facing the retaining device HE, the first bending device BE1 may include a number of recesses AN1, AN2, which correspond in number to the number of grooves NT and consequently to the number of outer slots SLA of the previously described laminated core BP and may be arranged so as to be open toward the retaining device HE and distributed along a circle concentrically with respect to the axis A1.

In some examples, the recesses AN1, AN2 serve (as receiving pockets) for receiving and retaining the first and the second end portions E1, E2 of the respective first and second winding segments P1, P2. In this case, the recesses AN1, AN2 include two different forms. First recesses AN1, which form a small group of recesses AN1, AN2, include in each case a cavity that extends continuously from the bottom surface US1 of the first retaining device HE1 to a top surface OS1 of the first retaining device HE1 that is located remotely from the bottom surface US1. The cavity, when viewed radially with respect to the axis AS1, includes a cross section that is realized tapering in steps from the bottom surface US1 toward the top surface OS1. In this case, the cavity includes three areas with different—with reference to the axis AS1—radial cross sectional areas.

In some implementations, the area that is located facing the bottom surface US1 of the first bending device BE1, which is referred to below as the first area RB1, includes a cross sectional area that is the largest compared with the remaining two areas.

The area that is located facing the top surface OS1 of the first bending device BE1, which is referred to below as the third area RB3, includes a cross sectional area that is the smallest compared with the remaining two areas. The area that is located between the first and the second areas RB1, RB3, which is referred to below as the second area RB2, includes a cross sectional area which has surface area between the cross section areas of the first and of the third areas RB1, RB3. This is illustrated in an enlarged section A of the first bending device BE1 in FIG. 3.

In some examples, a larger group of remaining recesses forms in each case a cuboid-shaped cavity, the cross section of which located perpendicular to the axis AS1 corresponds to the respective cross section of the second end portion E2 of the respective corresponding second winding segment P2. This makes it possible for the respective second end portions E2 to be received into the respective corresponding recesses. The recesses of the group are referred to below as second recesses AN2.

The device V may include a group of first retaining elements FE1 for retaining the first end portions E1 of the respective first winding segments P1. The first retaining elements FE1 may be realized in an L-shaped manner and include in each case a rod-shaped basic body GK, a head region KB with an enlarged cross sectional area at one end of the basic body GK and a base region SB at another end of the basic body GK.

In some examples, the first retaining elements FE1 are realized so as to be slidable in the respective first recesses AN1 in the direction of the axis AS1 between a locking position PS1 (see section B in FIG. 3) and an unlocking position PS2 (see section C in FIG. 3).

In this case, the basic bodies GK of the respective first retaining elements FE1 include in each case a cross sectional area which corresponds to the cross sectional area of the third region RB3 of the respective first recesses AN1, which makes it possible for the basic body GK of the respective first retaining elements FE1 to be received into the third region RB3 of the respective first recesses AN1 and the respective retaining elements FE1 to be slid in the direction of the axis AS1 in the respective first recesses AN1.

In some examples, the head regions KB of the respective first retaining elements FE1 include in each case a cross sectional area which corresponds to the cross sectional area of the second region RB2 of the respective first recesses AN1. This makes it possible for the head region KB of the respective first retaining elements FE1 to be received into the respective second area RB2 of the respective first recesses AN1 when the respective first retaining elements FE1 are slid from the respective locking positions PS1 and into the respective unlocking positions PS2.

If the first retaining elements FE1 are situated in the respective locking positions PS1, the head regions KB of the respective first retaining elements FE1 fill the first areas RB1 of the respective first recesses AN1 in such a manner that cavities are formed between the respective first retaining elements FE1 and the respective corresponding first recesses AN1, the cross sectional areas of which cavities correspond to the cross sectional area of the first end portions E1 of the respective first winding pins P1 which are received and retained in the corresponding recesses AN1.

The device V additionally includes a first actuator device SE1 for sliding the first retaining elements FE1 between the locking position PS1 and the unlocking position PS2.

The first actuator device SE1 may be realized in the shape of a hollow cylinder and concentrically with respect to the first bending device HE1 and consequently to the axis AS1 of the retaining unit HE. In some examples, the first actuator device SE1 is realized so as to be non-rotatable with respect to the first bending device BE1 and consequently so as to be synchronously rotatable with the first bending device BE1 in the circumferential direction thereof and so as to be axially slidable in the direction of the axis AS1 and in relation to the first bending device BE1, the first actuator device SE1 sliding the first retaining elements FE1 between the locking and the unlocking positions PS1, PS2 as a result of its axial movement. The first actuator device SE1 may include an actuator that moves the first retaining elements FE1 between the two positions PS1, PS2.

In some implementations (not shown), the first retaining elements FE1 are rotatably mounted in the respective first recesses AN1 and have in each case an eccentric head region which can be rotated by an actuator of the first actuator device SE1 between a locking position and an unlocking position.

In some examples, the device V additionally includes a first rotating and sliding device DE1 that is realized for rotating the first bending device BE1 and the first actuator device SE1 in a synchronous manner with respect to one another and in relation to the retaining device HE. The first rotating and sliding device DE1 may be additionally realized for sliding the first bending device BE1 and the first actuator device SE1 axially in relation to the retaining device HE. In addition, the first rotating and sliding device DE1 may be realized for sliding the first actuator device SE1 axially in relation to the first bending device BE1.

The device V may additionally include a second bending device BE2 which is also realized in the shape of a hollow cylinder and concentrically with respect to the retaining device HE and consequently to the axis AS1. The second bending device BE2, when viewed in the direction of the axis AS1, may be arranged offset from the retaining unit HE and is realized so as to be rotatable about the axis AS1 and in relation to the retaining device HE.

In some examples, on a bottom surface facing the retaining device HE, the second bending device BE2 includes the same number of recesses AN3, AN4 as that of the first bending device BE1, which are arranged so as to be open toward the retaining device HE and distributed along a circle concentrically with respect to the axis A1. The recesses AN3, AN4 serve analogously to the first and the second recesses AN1, AN2 (as receiving pockets) for receiving and for retaining the end portions E3, E4 of the respective corresponding third and fourth winding segments P3, P4. In this case, the recesses AN3, AN4 also include two different forms. In some examples, recesses which realize a smaller group and are referred to below as third recesses AN3 serve for retaining the third end portions E3 of the third winding segments P3 and are realized in each case substantially mirror-symmetrically with respect to the respective first recesses AN1. In some examples, recesses that realize a larger group and serve for retaining the fourth end portions E4 of the fourth winding segments P4 are realized in each case substantially mirror-symmetrically with respect to the respective second recesses AN2. Recesses of the larger group are referred to below as fourth recesses AN4.

In some implementations, the device V additionally includes a group of second retaining elements FE2 for retaining the third end portions E3 of the respective third winding segments P3. The second retaining elements FE2 are realized substantially mirror-symmetrically with respect to the respective first retaining elements FE3 and are arranged in a similar manner to the first retaining elements FE1 so as to be slidable in the respective third recesses AN3 between a locking position PS3 and an unlocking position PS4 (compare with FIGS. 5A to 5E).

In some examples, the device V additionally includes a second actuator device SE2 for sliding the second retaining elements FE2 between the locking position PS3 and the unlocking position PS4.

The second actuator device SE2 may be realized in the shape of a hollow cylinder and concentrically with respect to the second bending device HE2 and consequently to the axis AS1. In some examples, the second actuator device SE2 is realized analogously to the first actuator device SE1 so as to be non-rotatable with respect to the second bending device BE2 and consequently so as to be synchronously rotatable with the second bending device BE2 in the circumferential direction thereof and so as to be axially slidable in the direction of the axis AS1 in relation to the second bending device BE2.

In some implementations, the device V additionally includes a second rotating and sliding device DE2 that is realized for rotating the second bending device BE2 and the second actuator device SE2 in a synchronous manner with respect to one another and in relation to the retaining device HE. The second rotating and sliding device DE2 may be additionally realized for sliding the second bending device BE2 and the second actuator device SE2 axially in relation to the retaining device HE. In addition, the second rotating and sliding device DE2 is realized for sliding the second actuator device SE2 axially in relation to the second bending device BE2.

Figure 4:
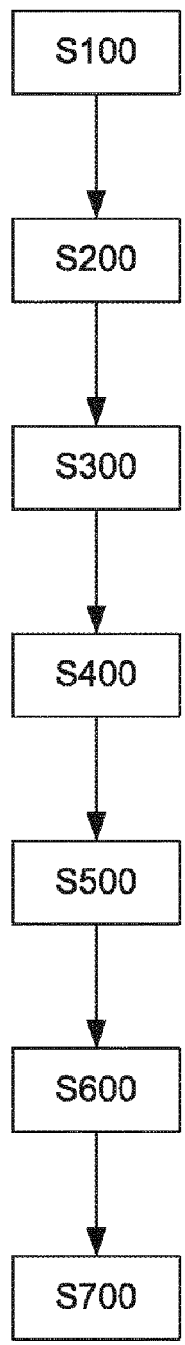
FIG. 4 shows a schematic flow chart of an exemplary method for producing the stator shown in FIG. 2.

After describing the device V for producing the windings WL of the stator ST in detail, a method for producing the windings WL is described in more detail by way of FIGS. 4 and 5A to 5F. In this case, FIG. 4 shows the sequence of the method in a schematic flow chart. FIGS. 5A to 5F show the device V and the stator ST or the intermediate products thereof prior to, during and after respective method steps, in each case schematic side views of portions of the stator ST or of the intermediate products thereof and of the device V and of the components thereof being shown after respective method steps.

To produce the windings WL of the stator ST shown in FIG. 2, a laminated core BP shown in FIG. 1 is provided according to a first method step S100. The laminated core BP is assembled from a number of metal disks punched from a metal rail in a manner known to the expert. In this case, the metal disks are punched such that, on the inside wall IW that is shaped as a cylinder lateral surface, the assembled laminated core BP includes a number of grooves NT, corresponding to the winding pitch of the stator ST, which extend in the direction of the axis AS of the laminated core BP. Layers of insulation paper IS are arranged in the respective grooves NT, the layers, when viewed in the direction of the axis AS of the laminated core BP, being formed in the shape of an S or an 8 and consequently dividing the respective grooves NT in each case into one outer and one inner slot SLA, SLI, the outer slots SLA including the afore-mentioned first and second slots SL1, SL2 and the inner slots SLI including the afore-mentioned third and fourth slots SL3, SL4.

According to a further method step S200, the previously described first, second, third, and fourth winding segments P1, P2, P3, and P4 of the winding pins WP, which have previously been interlocked and cranked beforehand in a manner known to the expert by way of an expanding step corresponding to the winding pitch of the stator ST, are inserted into the first, second, third and fourth slots SL1, SL2, SL3 and SL4. In this case, the winding segments P1, P2, P3, and P4 are inserted in such a manner into the respective slots SL1, SL2, SL3, and SL4 that in each case a first, second, third and fourth region B1, B2, B3, and B4 of the winding segments P1, P2, P3, and P4 projects out of the laminated core BP in each case by way of a first, second, third, and fourth exposed end portion E1, E2, E3, and E4. The first and the second winding segments P1, P2 in the respective first and second slots SL1, SL2 of the respective grooves NT and the third and the fourth winding segments P3, P4 in the corresponding third and fourth slots SL3, SL4 of the identical grooves NT are electrically insulated from one another and from the laminated core BP by means of the insulation paper layers IS.

In some examples, to form windings WL, the second winding segments P2 of the winding pins WP are directly connected electrically to the respective fourth winding segments P4 of the winding pins WP that are arranged offset to the winding pins WP corresponding to the winding pitch of the stator ST. To this end, the second and fourth winding segments P2, P4, which correspond to one another, are bent toward one another in each case by a predetermined bending angle. The first and the third winding segments P1, P3 are connected electrically to the external power source. To this end, the first and the third winding segments P1, P3 are bent in each case by a bending angle that deviates from the bending angle of the second and the fourth winding segments P2, P4.

To this end, the laminated core BP together with the inserted winding pins WP is non-rotatably retained by the retaining device HE concentrically with respect to the retaining device HE, as is illustrated in FIG. 5A.

The first and the second bending devices BE1, BE2 as well as the first and the second actuator devices SE1, SE2 are then driven, according to a method step S300, by the first and the second rotating and sliding devices DE1, DE2 in the direction toward the retaining device HE and are consequently lowered toward the laminated core BP, the second and the fourth end portions E2, E4 being received and retained by the respective second and fourth recesses AN2, AN4. The first and the third end portions E1, E3 are also received by the respective first and third recesses AN1, AN3. The first and the second retaining elements FE1, FE2, in this case, are positioned in the respective locking positions PS1, PS3 by the first and the second actuator devices SE1, SE2. In the locking positions PS1, PS3, the first and the second retaining elements FE1, FE2, with the respective corresponding side walls SW of the respective first and third recesses AN1, AN3, fix the respective first and third end portions E1, E3 such that they, as the second and the fourth end portions E2, E4, are non-movably retained (compare with FIG. 5B).

Whilst the end portions E1, E2, E3, E4 are retained in the respective recesses AN1, AN2, AN3, AN4, according to a further method step S400, the first bending device BE1, driven by the first rotating and sliding device DE1 together with the first actuator device SE1, is rotated about a first angle of rotation in a first rotational direction DR1, which is at the same time the first circumferential direction UR1 of the previously described first circle KS1. In this case, the first bending device BE1, driven by the first rotating and sliding device DE1 together with the first actuator device SE1, is lowered axially in the direction of the retaining device HE and consequently of the laminated core BP. As a result of the rotating and sliding movement of the first bending device BE1 in relation to the laminated core BP, the first and the second regions B1, B2 of the respective first and second winding segments P1, P2, when viewed radially, are all bent about a first bending angle BW1 in the first bending direction BR1 (compare with FIG. 5C).

At the same time, according to the method step S400, the second bending device BE2, driven by the second rotating and sliding device DE2 together with the second actuator device SE2, is rotated about a third angle of rotation in a second rotational direction DR2 that is opposite to the first rotational direction DR1. In this case, the second bending device BE2, driven by the second rotating and sliding device DE2 together with the second actuator device SE2, is lowered axially in the direction of the retaining device HE and consequently of the laminated core BP. As a result of the rotating and sliding movement of the second bending device BE2 in relation to the laminated core BP, the third and the fourth regions B3, B4 of the respective third and fourth winding segments P3, P4, when viewed radially, are all bent about a third bending angle BW3 in the second bending direction BR2 which faces the first bending direction BR1 (compare with FIG. 5C).

After the first bending operation according to the method step S400, according to a further method step S500, the first and the second actuator devices SE1, SE2 are slid in the axial direction away from the first and the second bending devices BE1, BE2 and consequently away from the laminated core BP. As a result of sliding the first and the second actuator devices SE1, S5E2 away from the laminated core BP, the first and the second retaining elements FE1, FE2 are slid from the respective locking positions PS1, PS3 into the respective unlocking positions PS2, PS4. As a result, the first and the third end portions E1, E3 are no longer retained by the first and the second retaining elements FE1, FE2 or in the first and the third recesses AN1, AN3 (compare with FIG. 5D).

The first bending device BE1, according to a further method step S600, driven by the first rotating and sliding device DE1 together with the first actuator device SE1 is then rotated further in the first rotational direction DR1 about a second angle of rotation. The first bending device BE1 and the first actuator device SE1, driven by the first rotating and sliding device DE1, are lowered further axially in the direction of the retaining device HE and consequently of the laminated core BP. As a result of the first bending device BE1 rotating and moving further axially in relation to the laminated core BP, the second regions B2 of the respective second winding segments P2 are bent further in the first bending direction BR1 about a second bending angle BW2 and consequently are bent further in total by up to a bending angle of BW1+BW2 (compare with FIG. 5E).

At the same time, according to the method step S600, the second bending device BE2, driven by the second rotating and sliding device DE2 together with the second actuator device SE2, is rotated further about a fourth angle of rotation in the second rotational direction DR2. The second bending device BE2 and the second actuator device SE2, driven by the second rotating and sliding device DE2, being lowered further axially in the direction of the retaining device HE and consequently of the laminated core BP. As a result of the rotating and sliding movement of the second bending device BE2 in relation to the laminated core BP, the fourth regions B4 of the respective fourth winding segments P4 are bent further about a fourth bending angle BW4 in the second bending direction BR2 and consequently are bent further in total by up to a bending angle of BW3+BW4(compare with FIG. 5E).

After the second bending operation according to the method step S600, according to a further method step S700, the second end portions E2 of the respective second winding segments P2 and the corresponding fourth end portions E4 of the fourth winding segments P4, which are located at a spacing from the second winding segments P2 corresponding to the winding pitch of the stator ST, are directly connected together electrically and mechanically after a welding operation by means of a respective welded joint SV. The first and the third end portions E1, E3 of the respective first and third winding segments P1, P3 are directly connected together electrically in a further welding operation with metal webs or jumper wires MB which produce electric connections between the windings WL and the external power source or control device (compare with FIG. 5F).

Rod-shaped straight wire produced from copper alloy may be used as winding segments in place of the hairpin-shaped winding pins. In some examples, the winding segments have two exposed end regions at the respective oppositely situated ends, and are first of all inserted into the corresponding slots of the laminated core and are then interlocked at the respective two end regions.

In each case a first of the two end regions of the respective winding segments which are arranged in a first and the same concentric row, which first end region is situated on the same side of the laminated core, is bent at a bending angle and electrically connected to an end region of a winding segment, which is arranged at a spacing corresponding to the winding pitch in a second concentric row and has also been bent at a bending angle.

Second end regions of the respective winding segments, which are located on the oppositely situated side of the laminated core, are bent at various bending angles in the manner described in conjunction with FIG. 2 and are electrically connected in a corresponding manner to corresponding winding segments or to the external power source or control device.

The device V described in conjunction with FIG. 1 and the method described in conjunction with FIG. 2 relate to a winding with a two-layered arrangement of winding segments where the winding segments are arranged distributed in two circles or rows that are concentric with respect to one another. The device V or the method may also be used to produce a winding with a three-layered or multiple-layered, in particular four-layered, arrangement of winding segments. Just simple modifications to the device or the method, which are able to be carried out without any problem by an expert, are needed for this purpose, such as, for example, as a result of additional bending devices with analogously realized recesses and retaining elements which just need to be realized or arranged concentrically with respect to the existing bending devices.

A number of implementations have been described. Nevertheless, it will be understood that various modifications may be made without departing from the spirit and scope of the disclosure. Accordingly, other implementations are within the scope of the following claims.

What is claimed is:

1. A method for producing a winding of a winding carrier of an electric machine, the method comprising the following method steps:
   providing a laminated core that includes at least one first slot for receiving at least one first winding segment of the winding and at least one second slot for receiving at least one second winding segment of the winding;

inserting the at least one first winding segment into the at least one first slot up to at least one first region that includes a first exposed end portion, and inserting the at least one second winding segment into the at least one second slot up to at least one second region that includes a second exposed end portion;

retaining the first end portion as a result of inserting the first end portion in a first recess of a first bending device and as a result of positioning a first retaining element into a locking position in the first recess, and retaining the second end portion as a result of inserting the second end portion in a second recess of the first bending device;

bending the first and the second region in a first bending direction about a first bending angle as a result of rotating the first bending device about a rotational axis concentrically with respect to the laminated core, whilst the first and the second end portions are retained;

releasing the first end portion as a result of moving the first retaining element from the locking position into an unlocking position; and bending the second region further in the first bending direction about a second bending angle once the first end portion has been released.

2. The method of claim 1, wherein the step of providing additionally provides that the laminated core is provided with at least one third slot for receiving at least one third winding segment of the winding and at least one fourth slot for receiving at least one fourth winding segment of the winding, the at least one third slot and the at least one fourth slot are arranged along a second circle which is concentric with respect to the laminated core.

3. The method of claim 1, wherein the step of inserting additionally provides that the at least one third winding segment is inserted into the at least one third slot up to at least one third region that includes a third exposed end portion, and that the at least one fourth winding segment is inserted into the at least one fourth slot up to at least one fourth region that includes a fourth exposed end portion.

4. The method of claim 1, wherein the step of retaining additionally provides that the third end portion is retained as a result of insertion into a third slot of a second bending device and as a result of positioning a second retaining element in a locking position in the third recess, and the fourth end portion is retained as a result of insertion into a fourth recess of the second bending device.

5. The method of claim 1, wherein the step of bending additionally provides that the third and the fourth regions are bent as a result of rotating the second bending device about the rotational axis concentrically with respect to the laminated core in a second bending direction, which is opposite to the first bending direction, about a third bending angle, whilst the third and the fourth end portions are retained.

6. The method of claim 5, wherein during the step of bending, the first, the second, the third, and the fourth regions are bent substantially at the same time.

7. The method of claim 1, wherein the step of releasing additionally provides that the third end portion is released as a result of moving the second retaining element from the locking position into an unlocking position.

8. The method of claim 1, wherein the step of bending further additionally provides that the fourth region is bent further in the second bending direction about a fourth bending angle once the third end portion has been released.

9. The method of claim 8, wherein during the step of bending further, the second and the fourth regions are bent substantially at the same time.

10. The method of claim 5, wherein rotating the first bending device and the second bending device about the rotational axis and relative to the retaining device is by way of a rotating and sliding device.

* * * * *